Dec. 8, 1931.   G. A. CLEAVELAND   1,835,144
ADJUSTABLE SWIVEL CASTER
Filed Dec. 8, 1928

INVENTOR:
GEORGE A. CLEAVELAND
By
ATTORNEY.

Patented Dec. 8, 1931

1,835,144

UNITED STATES PATENT OFFICE

GEORGE A. CLEAVELAND, OF GLENDALE, CALIFORNIA

ADJUSTABLE SWIVEL CASTER

Application filed December 8, 1928. Serial No. 324,746.

My invention relates to swivel casters and one of its objects is to provide a swivel caster which is adjustable vertically.

Swivel casters are extensively used on furniture and most generally in sets of four. On account of the warping of furniture or settling of floors it frequently happens that all four casters will not contact the floor at once. In these cases contact of all four casters with the floor can only be accomplished by blocking up one of the two "high" casters the exact vertical distance of the gap between that caster and the floor when the other three casters are down or by vertically adjusting one or more of the four casters precisely that distance necessary to eliminate the gap.

It is therefore an object of my invention to provide a swivel caster which is capable of a very fine vertical adjustment to bring all the casters of a piece of furniture into simultaneous solid contact with the floor.

Furniture is frequently moved out for cleaning beneath it and then returned to its original position. It is therefore of great importance that the adjustment of any adjustable caster on a piece of furniture be not lost owing to moving or lifting of the furniture.

It is a further object of my invention to provide a swivel caster having a vertical adjustment which cannot be lost by lifting or moving a piece of furniture upon which the caster is mounted.

Swivel casters for furniture must not detract from the appearance of the furniture. It is therefore absolutely essential that any adjusting mechanism used on an adjustable swivel caster for furniture must be practically out of sight in order for it to be possible to use that caster commercially.

It is a further object of my invention to provide a swivel caster having a mechanism for providing vertical adjustment which is practically removed from view.

As much handling of furniture in the home is done by the women, it is certain that they are the ones who will make greatest use of a vertically adjustable furniture swivel caster. In order for such a caster to be successful, therefore, its adjustment must be very easy of accomplishment, and not require any back-breaking lifting of the furniture, etc.

Another object of my invention is to provide a swivel caster for furniture in which a vertical adjustment may be accomplished with comparative ease.

Further objects and advantages will be made manifest in the following description and the accompanying drawings in which.

Figure 1:
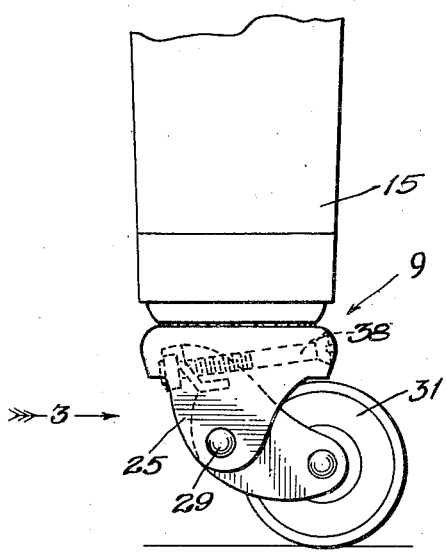
Figs. 1 and 2 are side elevational views of a preferred embodiment of my invention in the different adjusted positions.

Referring specifically to the drawings, the swivel caster 9 of my invention includes a socket 10 having a tubular member 11 an upper portion of which is split and formed so as to receive and retain a head 12 of a caster stem 13. The socket 10 is provided with an upper ball bearing race 14 which rests against the lower face of a furniture leg 15 when the caster 9 is applied to said leg. The lower end of the stem 13 is provided with a base plate 18 having a skirt 19 extending down from its outer edge. The plate 18 has a lower race 20 formed therein and balls 21 are placed between the races 14 and 20 so as to provide an anti-friction bearing.

Extending downward from opposite edges of the skirt 19 are ears 25. Disposed between the ears 25 is a yoke 26 having a head 27 and arms 28 extending downwardly therefrom. The arms 28 are pivotally connected by rivets 29 to lower portions of the ears 25. Rotatably mounted on a shaft 30 which extends between the lower extremities of the arms 28 is a roller 31.

The yoke head 27 has an opening 35 formed therein and at a point opposite thereto, a hole 36 is formed in the skirt 19. Extending through the holes 35 and 36 is a bolt 38 which screws into a nut 39 resting against the yoke head 27. Formed upon the upper portion of the yoke head 27 is a projection 40 which prevents the rotation of the nut 39. Formed on the end of the bolt 38 which projects through the nut 39 is an enlarged portion 42 which prevents the bolt 38 being unscrewed from the nut 39.

Figure 2:
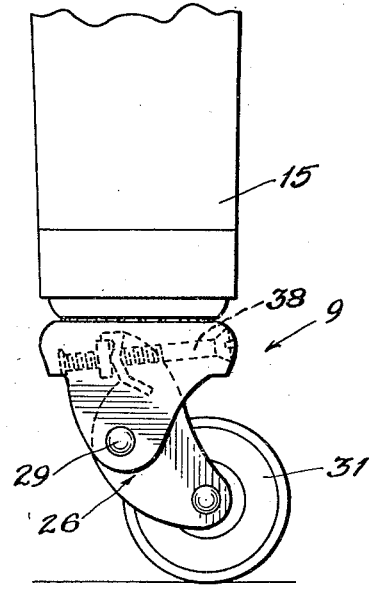
Figure 3:
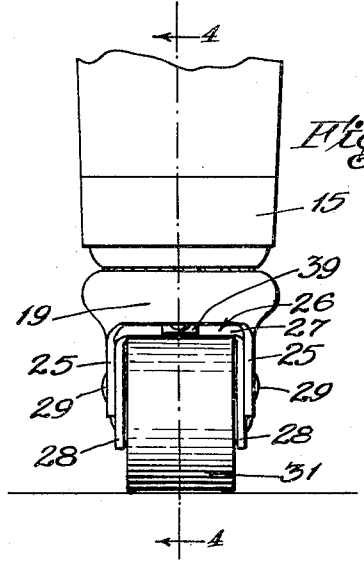
Fig. 3 is an elevational view taken in the direction of the arrow 3 in Fig. 1.
Figure 4:
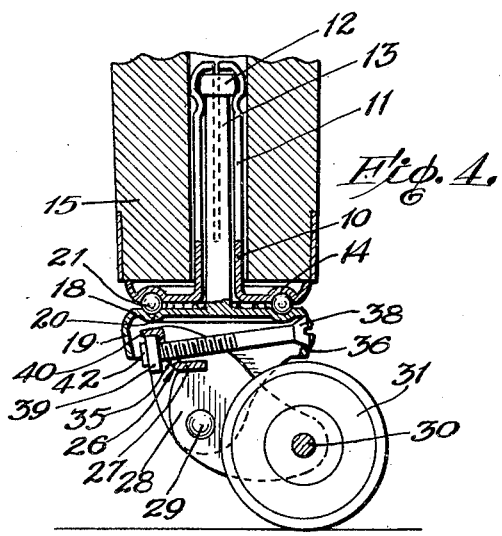
Fig. 4 is a vertical view taken on the line 4—4 of Fig. 3.

As can readily be seen by comparing Figs. 1 and 2, the height of the furniture leg 15 can be adjusted by turning the bolt 38 with a screw driver. This vertical adjustability is especially adapted to permit the leveling of various pieces of furniture where, owing to the warping of the furniture or the settling of the floors, all four casters on the furniture cannot be made to touch the floor.

It will therefore be seen that I have provided a swivel caster for use on furniture in which the roller can be given a very fine vertical adjustment; in which the mechanism of adjustment is practically hidden; and in which this mechanism is extremely simple to operate.

Although I show and describe but a single preferred embodiment of my invention, it is to be understood that various modifications may be made in this embodiment without departing from the spirit of the invention or the scope of the appended claims.

What I claim is:

1. In a swivel caster for furniture the combination of: caster attaching means; a caster base mounted on said attaching means for rotation thereon about a vertical axis; a roller yoke; means pivotally mounting said roller yoke upon said caster base; a roller rotatably mounted upon said yoke; a skirt extending downward from said base; and screw means mounted in said skirt and acting between said skirt and said yoke to adjust said roller vertically.

2. In a swivel caster for furniture, the combination of: a caster attaching means; a substantially circular caster base horizontally disposed and mounted on said attaching means for rotation thereon about a vertical axis passing substantially through the center of said base; mounting means extending downwardly from said base; a caster yoke pivotally mounted on said mounting means; a roller rotatably mounted on said yoke; and screw means disposed beneath said base and concealed thereby, said screw means acting between said base and said yoke to adjust said roller vertically.

3. In a swivel caster for furniture, the combination of: caster attaching means; a caster base mounted on said attaching means for rotation thereon about a vertical axis passing substantially through the center of said base; ears extending downwardly from opposite sides of said caster base; a yoke including two sheet metal yoke levers and a yoke head connecting a pair of adjacent ends of said levers; a roller pivotally mounted on a pin extending through the opposite ends of said levers from said yoke head; rivets pivotally securing intermediate portions of said yoke levers to said ears so that said yoke is disposed inside of said ears and pivotally mounted thereon on a horizontal axis disposed close to the vertical axis of said caster base; and screw means mounted on said caster base and disposed therebeneath so as to be practically hidden thereby, said screw means acting on said yoke head to swing said yoke about said rivets for adjusting the vertical position of said roller.

4. In a swivel caster for furniture, the combination of: caster attaching means; a caster base mounted on said attaching means for rotation thereon about a vertical axis, said caster base being stamped from sheet metal so as to have a pair of ears extending downwardly from opposite sides thereof and a skirt extending downwardly from an edge of said base to one side of said ears; a yoke having sheet metal yoke levers lying close against the inner faces of said ears, and a yoke head disposed between upper ends of said yoke levers; a roller pivotally mounted between lower ends of said yoke levers; means for pivotally securing said yoke levers to said ears; and a screw acting between said skirt and said yoke head to vary the distance therebetween and thereby rock said yoke levers about their pivotal mountings on said caster base ears.

5. In a swivel caster for furniture, the combination of: caster attaching means; a caster base mounted on said attaching means for rotation thereon about a vertical axis, said caster base being stamped from sheet metal and having a skirt extending downwardly from the edges thereof; a roller; roller mounting means on which said roller is pivotally mounted and extending upwardly just inside opposite portions of said skirt; means for shiftably mounting said roller mounting means on said skirt; means mounted on said caster base and disposed therebeneath so as to be practically entirely hidden by said skirt, said means co-acting between said caster base and said roller mounting means to move said roller mounting means relative to said skirt and vary the vertical position of said roller relative to said caster base.

6. A combination as in claim 1 in which said screw means includes a screw extending through an opening in said skirt having its head resting against said skirt and remaining in a fixed position relative to said caster base during the operation of said screw means.

7. A combination as in claim 1 in which said screw means includes a screw extending through an opening in said skirt having its head resting against said skirt and remaining in a fixed position relative to said caster base during the operation of said screw means; and a yoke head provided on said yoke at the upper end thereof just beneath said caster base and disposed within said skirt, said screw lying substantially within said skirt and engaging with said yoke head to cause movement of said yoke head relative to said screw during the operation of said screw means.

In testimony whereof, I have hereunto set my hand at Glendale, California, this 20th day of November, 1928.

GEORGE A. CLEAVELAND.